United States Patent [19]

Athenes et al.

[11] 4,327,442
[45] Apr. 27, 1982

[54] CLOCK RECOVERY DEVICE

[75] Inventors: Claude Athénes; Jacques E. Sallé; Philippe Blouin, all of Colombes, France

[73] Assignee: Le Materiel Telephonique Thomson-CSF, Colombes, France

[21] Appl. No.: 139,104

[22] Filed: Mar. 20, 1980

[30] Foreign Application Priority Data

Mar. 26, 1979 [FR] France .................. 79 07536

[51] Int. Cl.³ .................................. H03B 3/06
[52] U.S. Cl. ........................... 375/119; 328/63
[58] Field of Search .............. 375/4, 118, 119, 110; 328/63, 72, 108, 155, 164; 178/69 R, 70 R, 70 TS

[56] References Cited

U.S. PATENT DOCUMENTS

| 3,185,963 | 5/1965 | Peterson et al. | 375/118 |
|---|---|---|---|
| 3,266,024 | 6/1966 | Kersey | 364/900 |
| 3,576,570 | 4/1971 | Meier | 364/900 |
| 3,668,315 | 6/1972 | Heitzman | 375/119 |
| 4,227,251 | 10/1980 | Kazama et al. | 375/4 |

Primary Examiner—Benedict V. Safourek
Attorney, Agent, or Firm—Roland Plottel

[57] ABSTRACT

A clock recovery device for a digital data receiver. This device includes a first register for generating a clock signal having the same nominal frequency as the distant clock signal; a second register for detecting the pulses of the received signals, regenerating these received signals and then generating synchronization pulses, and a third register for retiming the regenerated pulses.

4 Claims, 4 Drawing Figures

CLOCK RECOVERY DEVICE

The present invention relates to a clock recovery device for a receiver of transmitted digital data.

In order to read incident data at the correct times, a data receiver must necessarily possess a device capable of reconstituting the distant clock signal.

In the field of data transmission, the distant clock is the name given to the clock of the data transmitting device at the rate of which data have been transmitted. The receiver is provided with a local clock whose nominal frequency f is the same as that of the distant clock to within the accuracy of the clocks. For example, such local clocks can be generated by means of crystal-controlled oscillators having errors of less than 50 parts in a million.

Until now, the problem of clock recovery has been solved by using linear circuits. Digital circuits have been recently proposed, but the jitter compensation they provide is completely inadequate.

The present invention proposes a clock recovery device based on digital techniques, largely independent of any jitter affecting the received signals.

According to one characteristic of the invention, the device for recovering the distant clock signal from one or more incident digital signals consists of:

first means for generating a clock signal having the same nominal frequency f as the distant clock signal from the signal produced by a local oscillator having a nominal frequency F, the latter being equal to nf and these first means possessing a resetting input;

second means for detecting the leading edges of the pulses of the received signal or signals, for regenerating the received signal or signals in the form of signals whose pulses are timed and synchronous with the local oscillator, and for generating a synchronization pulse following each detection of a leading edge, the output of the means generating the synchronization pulses being connected to the input of a first shift circuit whose output is connected to the resetting input of the first means and also to the input of a second shift circuit, selected as a function of the required characteristics of the regenerated pulses, whose output is connected to the resetting input of the second means;

third means for retiming the regenerated pulses, possessing a first shift circuit whose input is connected to the output of the first means and whose output produces the recovered distant clock signal, and a second shift circuit possessing a shift system for each received signal, the shift being the same for all the systems of the second circuit whose input is connected to the output of the received signal regeneration means and whose output produces the delayed signal, the shifts being selected such that the restored clock signal retimes the delayed signal pulses obtained from the second circuit as late as possible, i.e. one local oscillator period before the end of each pulse in order to optimize jitter compensation.

The purposes and characteristics of the present invention appear more clearly from the following description of a practical example, the said description referring to the appended drawings in which.

Figure 1:
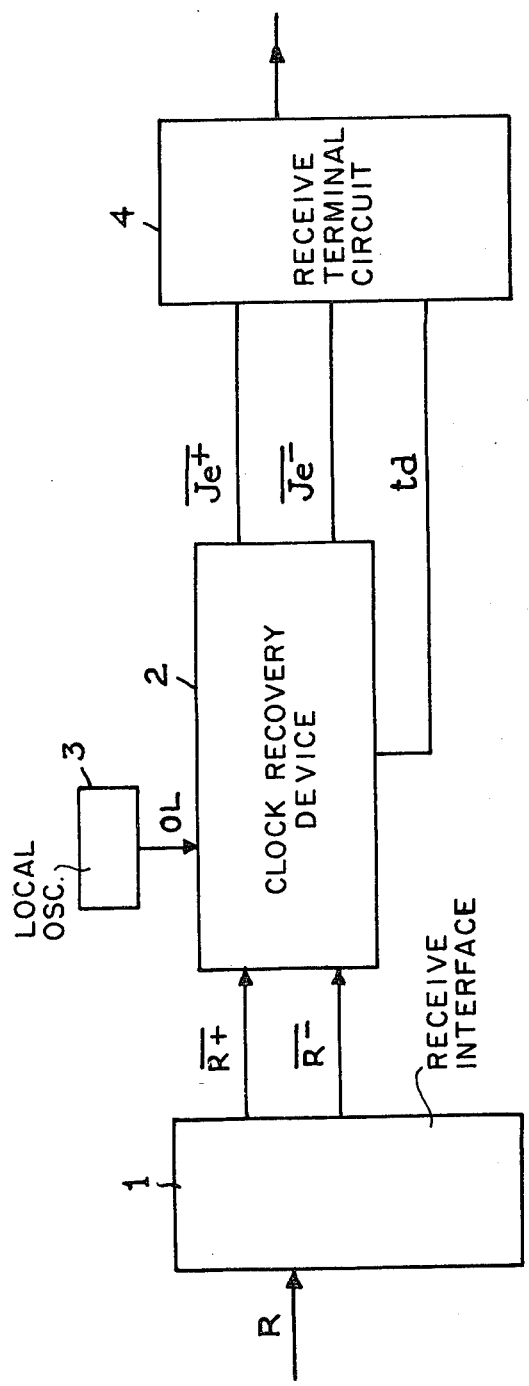
FIG. 1 represents the environments of a clock recovery device in a transmitted data receiver.

In the example described, the data to be transmitted are HDB3-encoded. The receiver shown in FIG. 1 possesses a receive interface 1 receiving the HDB3-encoded signals R and producing two digital signals $\overline{R+}$ and $\overline{R-}$, corresponding to the positive and negative pulses respectively. Signals R, $\overline{R+}$ and $\overline{R-}$ are represented by the first three wave-forms shown in FIG. 3.

These signals $\overline{R+}$ and $\overline{R-}$ are fed to the clock recovery device 2, which produces three signals: signal td, which is the restored distant clock signal, signal $\overline{Je+}$ corresponding to $\overline{R+}$ and signal $\overline{Je-}$ corresponding to $\overline{R}$. Device 2 is also fed with signal OL of a local oscillator 3.

Signals td, $\overline{Je+}$ and $\overline{Je-}$ are fed to a receive terminal circuit 4, which decodes the signals and resynchronizes them with the local clock before use.

Figure 2:
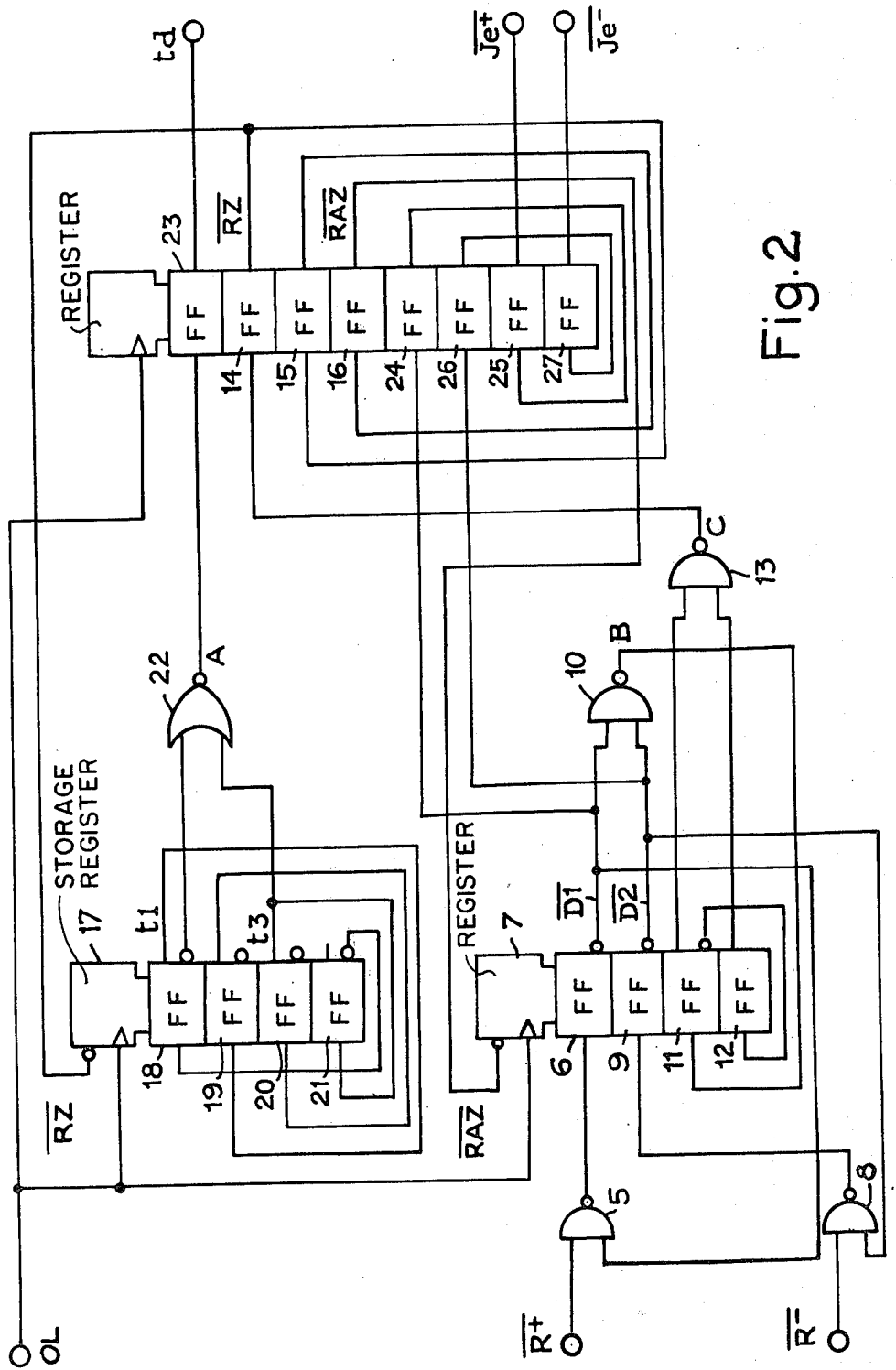
FIG. 2 is the diagram of a clock recovery device in accordance with the invention.

FIG. 2 shows the clock recovery device 2 in detail. This device is completely digital, since it consists only of logic gates and type D flip-flops, all the latter being fed with the clock signal OL produced by the local oscillator 3 and switching on the rising edges of this signal.

In the example described, since the nominal frequency of the local oscillator is F, the nominal frequency f of the distant clock at the rate of which data R are transmitted is equal to F/8.

The device possesses a first NAND gate 5, fed on one of its inputs with signal $\overline{R+}$, and whose output is connected to the input of a flip-flop 6 of a register 7, the inverted output of this flip-flop 6 being connected to the other input of NAND gate 5.

Similarly, the device possesses a second NAND gate 8, fed on one of its inputs with signal $\overline{R-}$, and whose output is connected to the input of a flip-flop 9 of register 7, the inverted output of this flip-flop 9 being connected to the other input of NAND gate 8.

The inverted outputs of flip-flops 6 and 9 are connected to the inputs of a NAND gate 10, whose output is connected to the input of a flip-flop 11 of register 7. The inverted output of flip-flop 11 is connected to the input of a flip-flop 12 of register 7, and the outputs of flip-flops 11 and 12 are connected to the inputs of a NAND gate 13, whose output produces a signal C.

Figure 3:
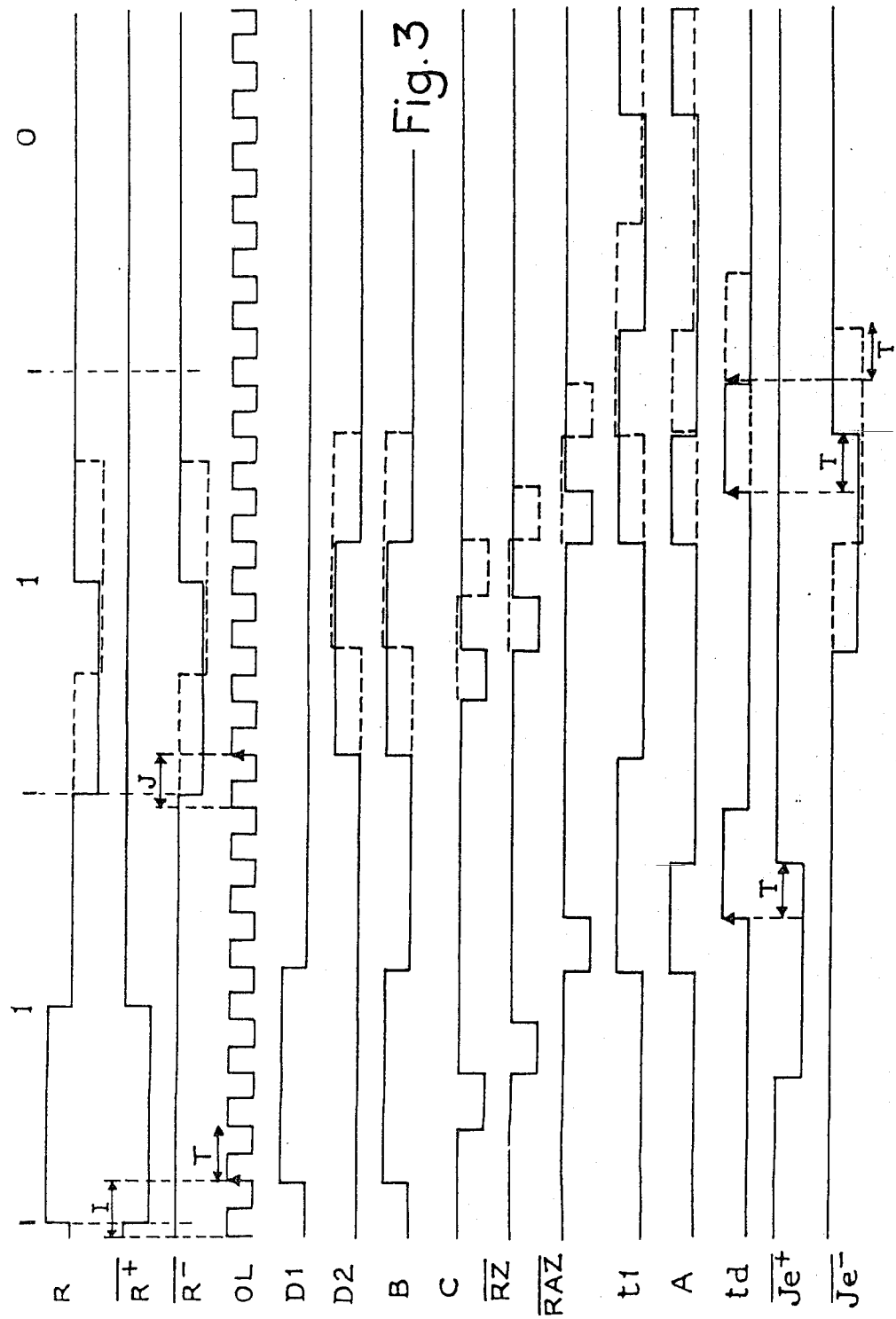
FIG. 3 represents the timing diagrams corresponding to operation of the device in FIG. 2.

FIG. 3 shows signal D1 obtained from flip-flop 6, signal D2 obtained from flip-flop 9 as well as signal B obtained from gate 10 and which is equal to D1+D2, and signal C obtained from gate 13.

Each time the leading edge of a pulse of signal $\overline{R+}$ or $\overline{R-}$ appears on the input of the device, a pulse of width equal to the period T of the local oscillator is obtained on the output of gate 13.

Signal C is shifted in time by three periods T by means of three flip-flops 14, 15 and 16. The input of flip-flop 14 is connected to the output of gate 13, the input of flip-flop 15 is connected to the output of flip-flop 14, and the input of flip-flop 16 is connected to the output of flip-flop 15, its output being connected to the resetting input of register 7.

Signal $\overline{RAZ}$ resetting register 7 and obtained from flip-flop 16 is shown in FIG. 3. This signal $\overline{RAZ}$ determines the width of the pulses of signals $\overline{D1}$ and $\overline{D2}$, this width being equal to four periods T of the local oscillator. This width calibration of signals $\overline{D1}$ and $\overline{D2}$ with respect to the variable-width pulses of signals $\overline{R+}$ and $\overline{R-}$ results in error-free operation.

It should be noted that the pulse of signal D1 is the same independent of the instant at which the leading edge of the pulse of $\overline{R+}$ occurs during the interval I shown in FIG. 3. Similarly, signal D2 is the same independent of the instant at which the edge of $\overline{R-}$ occurs during interval J.

In order to generate the clock signal, the device possesses a four-flip-flop storage register 17, the output of the first flip-flop 18 being connected to the input of the second flip-flop 19, the output of the second flip-flop 19 being connected to the input of the third flip-flop 20, the output of the third flip-flop 20 being connected to the input of the fourth flip-flop 21, and the inverted output of the fourth flip-flop 21 being connected to the input of the first flip-flop 18.

This register 17 thus operates as a divide-by-8 circuit, since the signals obtained from flip-flops 18, 19, 20 and 21 (as well as t1 obtained from flip-flop 18) have a frequency equal to f, i.e. equal to F/8. Signal t1 is shown in FIG. 3.

Since the shape of signal t1 varies with the jitter, a signal A having a fixed width equal to two periods T of the local oscillator is generated by means of NAND gate 22, which is fed with signal $\overline{t1}$ obtained on the inverted output of flip-flop 18 and signal t3 obtained on the output of flip-flop 20.

The output of gate 22 is connected to the input of a flip-flop 23, which shifts signal A by a period, thereby producing the restored distant clock signal td.

Once generated, the clock signal must be synchronized with the received signals. For this reason, the output of flip-flop 14 is connected to the resetting input of register 17. Signal $\overline{RZ}$ resetting register 17 to zero and obtained from flip-flop 14 is shown in FIG. 3. The clock signal td is thus resynchronized on each leading edge of a pulse of $\overline{R+}$ or $\overline{R-}$, and in the absence of any pulse, signal td continues to be provided by register 17.

Finally, it is desirable to achieve the best possible jitter compensation. This is achieved when the clock signal td retimes the data as late as possible, i.e. when the rising edge of td occurs one period T of the local oscillator before the trailing edge of the data pulses. For this reason, the data signals are shifted to this optimum position with respect to the clock signal td.

Signal $\overline{D1}$ is thus shifted by two periods T by flip-flops 24 and 25, the input of flip-flop 24 being connected to the inverted output of flip-flop 6, the input of flip-flop 25 being connected to the output of flip-flop 24 and the output of flip-flop 25 producing the data signal $\overline{Je+}$ correctly retimed by the clock signal td.

Similarly, signal $\overline{D2}$ is shifted by two periods T by means of flip-flops 26 and 27, the input of flip-flop 26 being connected to the inverted output of flip-flop 9, the input of flip-flop 27 being connected to the output of flip-flop 26 and the output of flip-flop 27 producing the data signal $\overline{Je-}$ correctly retimed by signal td.

In FIG. 3, signals unaffected by jitter are represented by full lines, whilst a case of operation affected by jitter and more exactly a case for which signal $\overline{R-}$ is delayed by two periods T compared with the jitter-free operation, is represented by dashed lines. The pulses relating to $\overline{R-}$ are all shifted by two periods in the signals shown and the clock td is forthwith synchronized.

In addition, in order to determine the maximum jitter tolerated by this device, the worst case must be considered for recovering the distant clock. In the case of HDB3 encoding, the worst case is the transmission of three "0's" followed by a "1".

Figure 4:
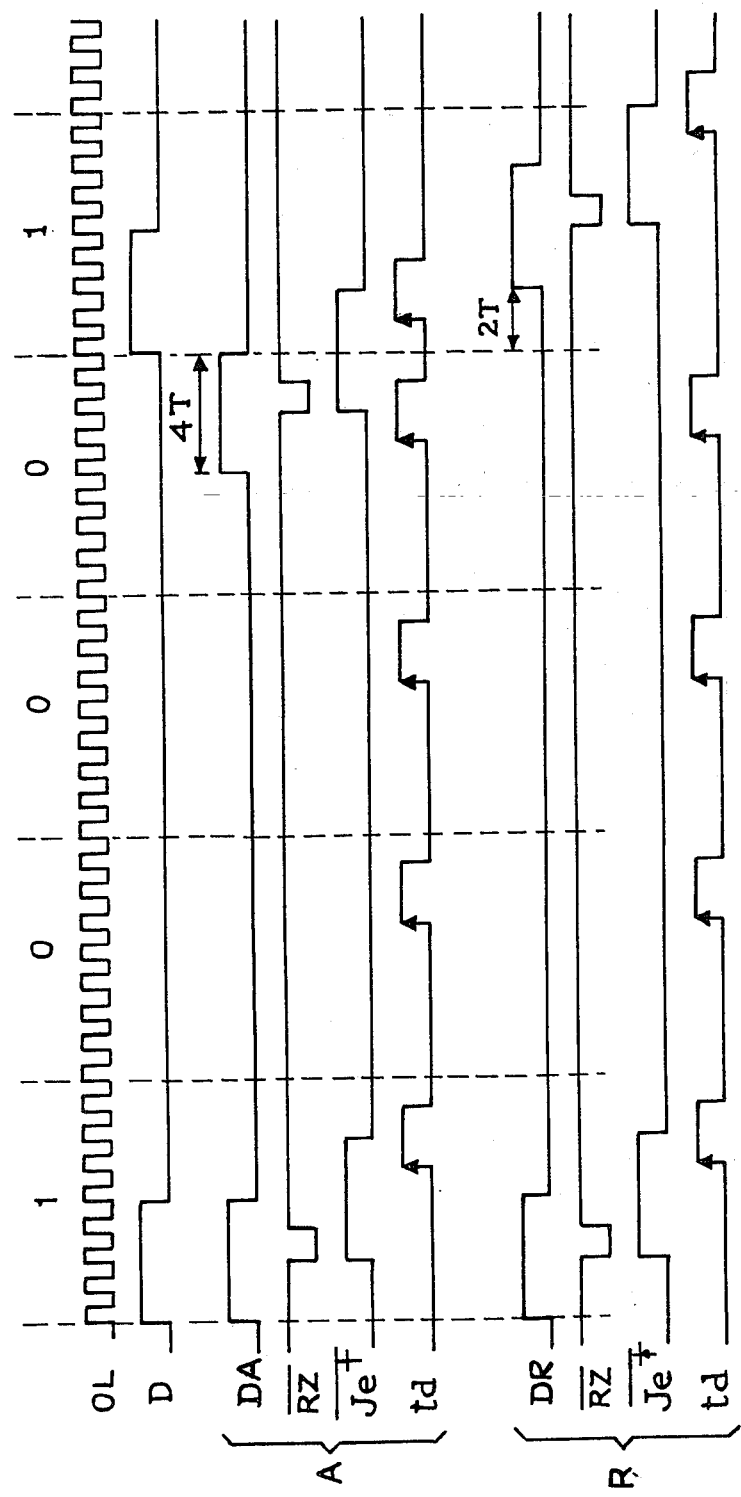
FIG. 4 represents two examples of jitter compensation.

The timing diagram for this worst case is shown in FIG. 4.

The first wave-form represents the local oscillator signal, whilst the second wave-form represents the regenerated data signal D consisting of a "1" followed by three "0's", again followed by a "1". The signal D shown is without jitter.

The next four wave-forms included in the bracket A represent the signals when the data signal D is advanced with respect to the oscillator. The case shown is that of maximum jitter compensation, since beyond this case clock td can no longer be correctly resynchronized. The reset signal $\overline{RZ}$ limits the maximum tolerable jitter to four times the period T ($-4T$) of the local oscillator.

The next four wave-forms bracketed R represent the signals when the data signal D has maximum delay due to jitter, this maximum tolerated jitter being limited by the reset signal $\overline{RZ}$ to twice the period T ($+2T$) of the local oscillator.

The maximum tolerated jitter over four bits is therefore from $-4T$ to $+2T$. Since jitter is symmetrical, the limits should be considered as $\pm 2T$, i.e. 4T peak-to-peak.

In both these cases of jitter, the clock td is brought into phase when the pulses occur and, in the absence of pulses, clock td is provided by register 17.

Since the device proposed by the present invention is based on digital techniques, i.e. contains only semiconductor components, it can be integrated completely onto a single chip, such that the clock recovery device can be provided in the form of a single integrated circuit.

In addition, since the device is completely independent of the local oscillator phase, the same local oscillator may be used for several clock recovery devices, or the distant clock recovered by a first device may be used as the local oscillator signal for a second device.

We claim:

1. A device for recovering the distant clock signal from one or more incident digital signals, comprising first means for generating a clock frequency having the same nominal frequency f as the distant clock signal from local oscillator means for producing a having a nominal frequency F, equal to nf, and said first means having a resetting input, second means including means for detecting the leading edges of the pulses of the received signal or signals and means for generating a synchronization pulse following each detection of a pulse leading edge, characterized by the fact that the second means has a resetting input and further includes means for regenerating the received signal or signals in the form of a signal or signals whose pulses are calibrated in width, and synchronous with, the local oscillator, first and second shift circuits, the output of said synchronization pulse generation means being connected to the input of said first shift circuit whose output is connected to said resetting input of the first means and also to the input of said second shift circuit which is selected as a function of the desired width of the regenerated pulses, and whose output is connected to said resetting input of the second means, and by the fact that the device further includes third means for retiming the regenerated pulses, said third means including a first shift circuit whose input is connected to the output of the first means and whose output produces the recovered distant clock, and a second shift circuit which includes for each received signal a shift system, the shift being the same for all the systems of the second shift circuit, whose input is connected to the output of the means regenerating the received signal and whose output produces a delayed signal, the number of shifts being selected such that the recovered clock signal retimes the pulses of the delayed signals obtained from the second circuit as late as possible, i.e. one local oscillator period before the end of each pulse in order to allow maximum possible jitter compensation.

2. A clock signal recovery device in accordance with claim 1, for which n is an even number and greater than or equal to eight, characterized by the fact that the second means comprising received signal detection and regeneration means constituted for each received signal, a NAND gate fed on one of its inputs with this signal and by a flip-flop whose input is connected to the output of the NAND gate and whose inverted output is connected to the other input of the NAND gate; and of synchronization pulse generation means constituted by a first NAND gate whose inputs are connected to the inverted inputs of the flip-flops of the detection means; a first flip-flop whose input is connected to the output of the first NAND gate, by a second flip-flop whose input is connected to the inverted output of the first flip-flop, the flip-flops of the detection means as well as the first and second flip-flops of the generation means forming part of the same storage register when clocking input is connected to the local oscillator, by a second NAND gate whose inputs are connected to the outputs of the first and second flip-flops and by a group of shift flip-flops whose clocking inputs are connected to the local oscillator, the first having its input connected to the output of the second NAND gate and its output connected to the resetting input of the first means, the second flip-flop of the group of flip-flops having its input connected to the output of the first flip-flop and its output connected to the input of the third flip-flop of the group of flip-flops, and so on up to the $(n/2-1)^{th}$ and last flip-flop of the group of flip-flops, whose output is connected to the resetting input of the detection means storage register.

3. The clock signal recovery device in accordance with claim 2, characterized by the fact that the first shift circuit of the third means comprising a $(n/2-3)$-flip-flop shift register, whose clocking input is connected to the local oscillator, whose input is connected to the output of the first means and whose output produces the recovered distant clock signal, and by the fact that the second shift circuit of the third means comprising for each received signal of a shift register whose input is connected to the output of the corresponding flip-flop of the storage register of the second means, the shift registers of the second circuit having their clocking inputs connected to the local oscillator and each comprising $(n/2-2)$ flip-flops, the output of the last flip-flop producing a regenerated and delayed data signal.

4. A clock signal recovery device in accordance with claim 1, or 2, or 3, characterized by the fact that the device is integrated on a single chip.

* * * * *